E. B. WILLS.
FURROW GAGE.
APPLICATION FILED APR. 18, 1912.
1,074,763.
Patented Oct. 7, 1913.
2 SHEETS—SHEET 1.
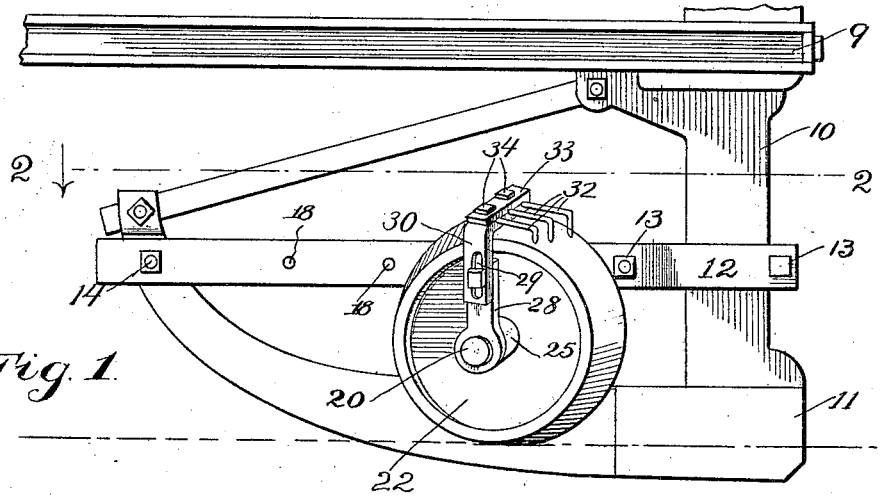
Fig. 1.
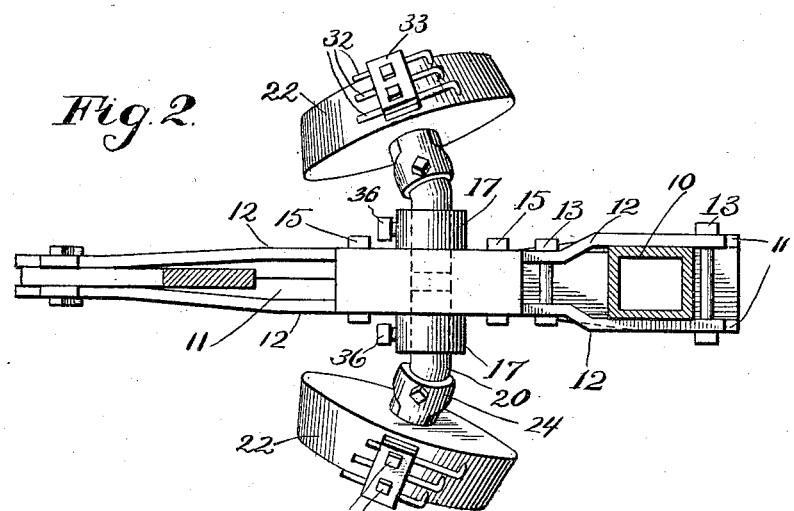
Fig. 2.
Fig. 4.
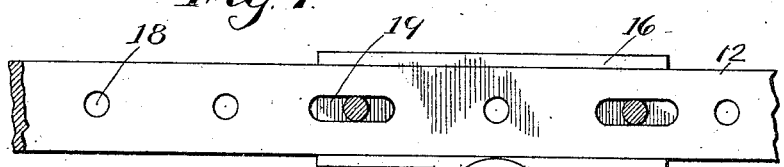
Witnesses:
Inventor
Edgar B. Wills.
by Banning & Banning
Attys.

E. B. WILLS.
FURROW GAGE.
APPLICATION FILED APR. 18, 1912.
1,074,763.
Patented Oct. 7, 1913.
2 SHEETS—SHEET 2.
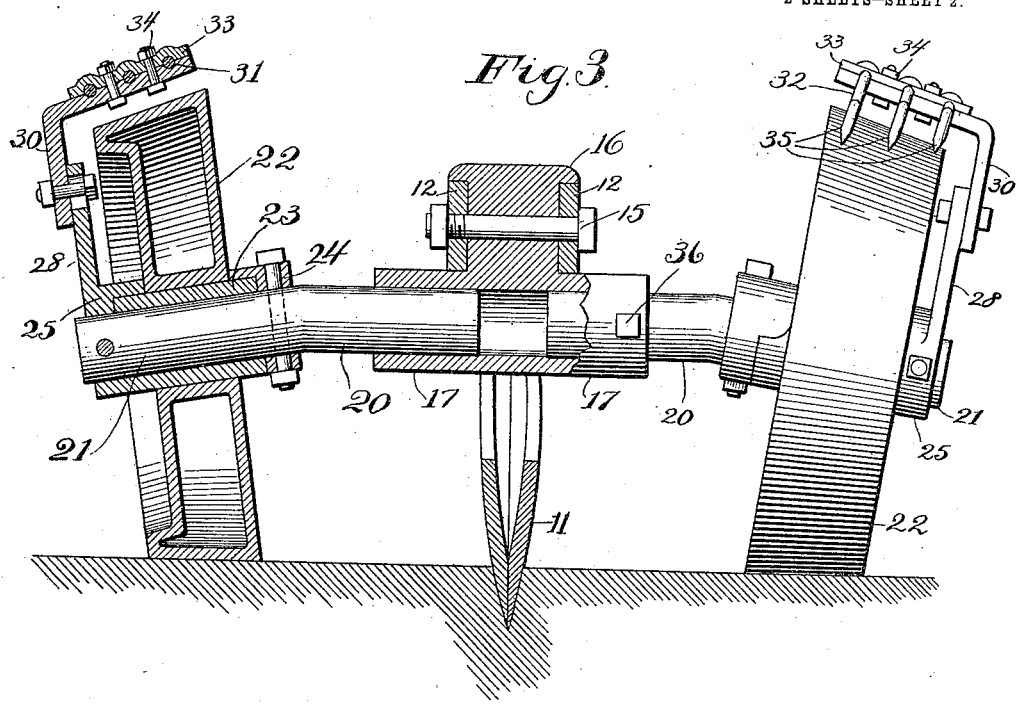
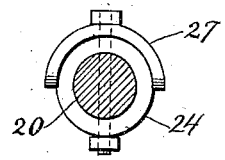
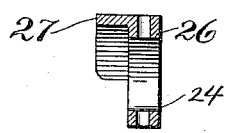
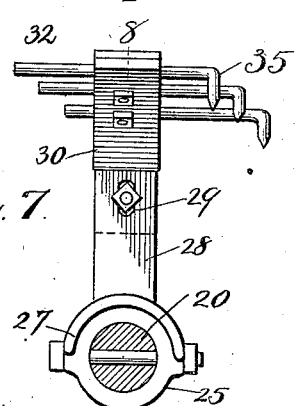
Witnesses
Inventor
Edgar B. Wills.
by Banning & Banning
Attys.

UNITED STATES PATENT OFFICE.

EDGAR B. WILLS, OF MENDOTA, ILLINOIS.

FURROW-GAGE.

1,074,763.   Specification of Letters Patent.   Patented Oct. 7, 1913.

Application filed April 18, 1912. Serial No. 691,559.

*To all whom it may concern:*

Be it known that I, EDGAR B. WILLS, a citizen of the United States, residing at Mendota, in the county of Lasalle and State of Illinois, have invented certain new and useful Improvements in Furrow-Gages, of which the following is a specification.

The present invention relates to a device which is used to regulate the depth which the shovel of a grain planter enters the ground, whereby the depth of planting is regulated in accordance with the kind of seed being planted and other conditions.

The objects of the present invention are to arrange the wheels in oblique relation to the shovels of the planter, so that the dirt thrown outward by the shovels will not clog or mat between the shovels and the gage wheels; to provide means for adjusting said gage wheels with respect to the ground line by a simple operation; to provide a shield for preventing the entrance of dirt into the bearings of the wheels, and to utilize this shield as a locking washer for holding the wheels in position upon the trunnions; to provide a cheap and simple scraper for the wheels, which will create but a relatively slight amount of friction, and which will be readily and easily adjustable when desired; and to provide a framework supporting said gage wheels, which is adjustable longitudinally of the shovels, and to arrange said adjusting mechanism so that a slight adjustment can be made without a removal of any of the locking parts.

The invention further consists in the features of construction and in the combination of parts hereinafter described and claimed.

In the drawings, Figure 1 is a side elevation showing the furrow gage of the present invention in operative position upon a planting machine; Fig. 2, a plan view taken on line 2—2 of Fig. 1; Fig. 3, a vertical section through the supporting frame for said wheels, showing one of the wheels in section and the other in elevation; Fig. 4, a detail showing the connection between the framework carrying the wheels and the main support therefor; Figs. 5 and 6, details of the combined locking washers and shields of the present invention; Fig. 7, a side elevation of the scraper mechanism and the supporting means therefor; and Fig. 8, a section on line 8—8 of Fig. 7.

In the art to which the present invention relates, means of various kinds have been employed which regulate the depth which the shovels of the planter enter the earth, thereby regulating the depth of the furrow into which the seed is dropped. Difficulty has been experienced with these devices in that the earth as it is turned back by the shovels will clog or accumulate between the wheels and shovels, owing to the necessary close proximity of the wheels to the sides of the shovel; and such clogging is undesirable because it interferes materially with the progress of the machine over the ground. In the present invention, the furrow gages are so positioned as to efficiently accomplish their work, and at the same time are so arranged as to provide sufficient space between the shovels and gages to permit the earth to fall away from the shovels in a free and easy manner and eliminate the objectionable feature of dirt clogging between the shovels and wheels.

Referring to Fig. 1 of the drawings, the device is shown as applied to an ordinary corn planter, having a frame 9, with the boot 10 depending therefrom, and the shovels 11 at the lower end of the boot. The construction and arrangement of the foregoing mentioned parts can be of any suitable style which is adapted to accomplish the work of an ordinary planting machine. Lying upon opposite sides of the boot are bars 12, which are held clamped against the sides of the boot by suitable locking members 13; and these bars extend forward and are hung between the shovels adjacent the upper end thereof, as indicated at 14, or in any other suitable manner desired.

Attached to the bars 12, through the medium of suitable locking members 15, is a supporting frame 16, which has rigidly connected thereto suitable bearings or hubs 17, which, as shown clearly in Figs. 2 and 3, are arranged upon opposite sides of the shovels. A series of holes 18 are provided in the bars 12, each of which holes is adapted to receive one of a series of locking members 15. By removing the locking members and positioning the frame at different points along the bars 12, the gage wheels can be placed at any desired distance with respect to the shovels, since the bearings and wheels will be moved with the frame. Two of the holes 18 are elongated, as indicated at 19 in Fig. 4. When the locking members 15 are in these latter holes, the frame 16 can undergo slight adjustments without removal of the locking members. This would be accomplished simply by loosening the locking members and sliding the plates until said members reach an end of the slots 19, and then tightening the locking members in position.

The bearings 17 are adapted to receive trunnions 20, which are clearly illustrated in Fig. 3. In the form shown there are two trunnions, but, obviously, if the conditions should warrant, both trunnions might be cast in one piece. Each trunnion is bent at a point midway of its length to produce an offset end 21, which is adapted to receive the gage wheel 22. By bending the trunnions in the manner shown and described, the gage wheels when positioned thereon are placed at an angle with respect to the shovels, so that they lie in planes converging toward the front of the machine, as indicated in Fig. 2. In order to have the wheels rest squarely upon the ground, it is necessary to bevel the rim of the wheels in the manner shown, and when constructed this way they will have a firm and solid bearing upon the earth so as to effectively perform the functions of a gage wheel and at the same time they will be spread or set apart a sufficient distance from the sides of the shovels so that the dirt thrown from the shovels will not congest between the shovels and wheel.

As the wheels are illustrated in the drawings, they are set a somewhat farther distance apart than they would probably be in actutal practice, since for clear illustration of the various parts it was not advisable to crowd the wheels too closely to the frame. It will be readily understood, however, that the wheels can be set sufficiently close to the shovels to effectively perform the gaging operation and at the same time leave sufficient space between the shovels and wheels for the dirt to escape. It is desirable in devices of this kind to locate the wheels relatively close to the shovels, since if they were spread away from the shovels any marked distance the irregularity of the ground over which they were running might be such that the wheels would be riding upon a ridge and the shovel lying in a depression, and hence would not enter the ground and perform their furrow making operation. When the wheels are arranged in close proximity to the shovel, however, the ground which the shovel is traversing will be of the same nature as that over which the wheels are passing, and the wheels and shovels will rise and fall in uniformity.

The wheels 22 revolve upon a bushing 23, and said wheels are maintained against longitudinal movement upon the trunnions through the medium of an inner locking washer 24 and an outer locking washer 25.

The inner washer is shown more clearly in Fig. 6 and consists of a ring-like portion 26, having suitable openings therein to receive a locking member, and a hood or shield-like portion 27, the outer end of which abuts against the face of the wheel. This shield or hood prevents the dirt which may drop off the wheel from above the bearing thereof from entering the bearings and impairing the easy running of the wheel. The outer locking washer is provided with a similar hood or shield 27, as shown in Fig. 8, and this outer washer is further provided with an upwardly extending standard or support 28, which has a slot 29 adjacent its upper end through which extends a suitable locking member to connect a plate 30 therewith. This plate 30 is bent, as will be seen from Figs. 3 and 8, so as to overlie the periphery of the wheel, and the plate has its upper face formed in the construction shown, with grooves 31, which receive rods 32; and the rods are held in place upon the plate through the medium of a cap-piece 33 and bolts 34. The rods 32 are bent at their end as indicated in Figs. 2 and 7; and these bent ends 35 engage with the periphery of the wheels 22 at various distances across the periphery and act as scraper mechanism to remove the dirt or other debris from the surface of the wheel. This scraper mechanism is especially desirable, since it places only a relatively small surface in engagement with the periphery of the wheel, thus reducing the friction incident to the action of the scrapers.

The rods can be moved longitudinally of themselves by loosening the bolts or locking members 34, so that when the ends 35 become worn, the rods can be moved in their holder to a position where the ends 35 will be in proper engagement with the periphery of the wheel. If it is not deemed desirable to adjust the height of the wheels by loosening the locking members 13 and raising the bars 12, the wheels can be adjusted by loosening the set screws or locking members 36, which are carried by the bearings 17, and rotating the trunnions within said bearings to change the position of the offset ends upon which the gage wheels are mounted, whereby said wheels are raised or lowered as desired.

I claim:

1. In a device of the class described, the combination with the boot and shovel of a grain planter, of wheels upon opposite sides of the shovel, a framework supporting said wheels, horizontally extending bars lying upon opposite sides of the boot, adjustable fastening means for holding said bars in place, each bar having a series of alined holes therein, and fastening members carried by said frame adapted to be inserted through said holes, two adjacent of said holes being elongated to permit limited adjustment of said frame longitudinally of the bar without removal of the locking members from position, substantially as described.

2. In a device of the class described, the combination with a boot and shovel of a grain planter of a T-shaped casting having a bore through its horizontal portion, bars arranged upon opposite sides of the vertical portion of the casting, an adjustable connection between said bars and casting, means for securing one end of said bar to the boot and the opposite end to the shovel, trunnions mounted in said bore, and gage wheels secured to said trunnions, substantially as described.

EDGAR B. WILLS.

Witnesses:
 WM. P. BOND,
 EPHRAIM BANNING.

Copies of this patent may be obtained for five cents each, by addressing the "Commissioner of Patents, Washington, D. C."